US005194848A

United States Patent [19]

Kerr

[11] Patent Number: 5,194,848

[45] Date of Patent: Mar. 16, 1993

[54] INTRUSION DETECTION APPARATUS HAVING MULTIPLE CHANNEL SIGNAL PROCESSING

[75] Inventor: Reginald J. Kerr, British Columbia, Canada

[73] Assignee: Hitek-Protek Systems Inc., Delta, Canada

[21] Appl. No.: 756,210

[22] Filed: Sep. 9, 1991

[51] Int. Cl.[5] .......................... G08B 13/00; H04B 1/06

[52] U.S. Cl. .................................... 340/566; 340/522; 367/136

[58] Field of Search ............... 340/541, 566, 529, 522, 340/825.77; 73/594, 649; 367/136

[56] References Cited

U.S. PATENT DOCUMENTS

| | | | |
|---|---|---|---|
| 3,614,724 | 10/1971 | Brown et al. | 340/566 X |
| 3,833,897 | 9/1974 | Bell et al. | 367/136 |
| 4,223,304 | 9/1980 | Barowitz et al. | 340/566 |
| 4,307,387 | 12/1981 | Baxendale | 340/566 |
| 4,853,677 | 8/1989 | Yarbrough et al. | 340/566 X |

FOREIGN PATENT DOCUMENTS

| | | |
|---|---|---|
| 967259 | 5/1975 | Canada . |
| 1273428 | 8/1990 | Canada . |

OTHER PUBLICATIONS

Information Sheet Vindicator Corporation Locator TW-3000 Taut Wire Fence Alarm No. of pages: 10.

*Primary Examiner*—Jin F. Ng
*Assistant Examiner*—Thomas J. Mullen, Jr.
*Attorney, Agent, or Firm*—Robert H. Barrigar

[57] ABSTRACT

Intrusion detection apparatus for use in perimeter security systems and the like is provided with multiple channel signal processing. Each signal processor includes a bandpass filter whose passband is selectable. Each is respectively responsive to sensed movement including vibrations within the associated selected passband. An output affirmative signal is generated if the amplitude of the input signal constituent within the associated frequency range exceeds a threshold level for a predetermined period of time. A logic circuit receives the outputs of all of the signal processors and provides an output alarm signal when a predetermined combination of affirmative signals is received from the signal processors. Such logic circuit preferably works with digital signals obtained by analog-to-digital conversion. A threshold bias adjustment may be provided for adjusting the threshold amplitude of at least one input signal so that ambient noise may be taken into consideration by the logic circuit so that as ambient noise increases the tendency otherwise present to generate a false alarm will be impeded.

7 Claims, 2 Drawing Sheets

INTRUSION DETECTION APPARATUS HAVING MULTIPLE CHANNEL SIGNAL PROCESSING

FIELD OF INVENTION

This invention relates to intrusion detection apparatus and particularly to the signal processing portion of such apparatus.

BACKGROUND OF THE INVENTION

A wide variety of intrusion detection equipment is known. Some of it is for use in perimeter security systems where for example, a special taut wire perimeter fence may be installed which, when cut or jarred, generates a signal which in turn triggers an alarm. Enclosed buildings or spaces within such buildings often have intrusion detection sensors for detecting the opening of windows or doors, the cutting of electric circuits, etc. and may be provided with infra-red or other movement-detecting sensors within confined areas. Sensors are known for responding to seismic vibrations; platform sensors are available for placement around railway tracks to sense unwanted human intrusion upon such tracks.

Conventionally, the signal processing circuitry following the particular intrusion detection sensor employed will be tailored to the specific sensor and specific adaptation at hand.

If the intrusion detection system designer perceives that more than one type of intrusion is expected, then several detectors may be utilized, each with its own associated circuitry. In some cases, the outputs of two or more such circuits are compared against some standard or threshold, as for example in U.S. Pat. No. 4,223,304 (Barowitz, Sep. 16, 1980) and U.S. Pat. No. 4,107,660 (Chleboun, Aug. 15, 1978).

A difficulty with the known intrusion detection signal processors is that they are relatively inflexible, being adapted for use with particular sensors operating within particular frequency ranges. However, in a particular application, a number of different types of intrusion may be expected, and consequently several different types of sensor may be required to be employed.

A further difficulty with many of the known systems is that they are sensitive to transients and spurious signals that may cause false alarms. To some extent the known systems have circumvented these problems by incorporating delay circuitry that rejects signals above a particular amplitude threshold but whose duration is too short to be likely to represent an intrusion. However, these systems tend not to be able to discriminate persistent signals of sufficient amplitude caused by unwanted intrusion from those caused by an increase in vibration level generally. By way of example, suppose that a secured military area within a perimeter fence attached to an intrusion detection system, is a site for frequent helicopter landings. If the sensitivity of the perimeter fence detector and associated circuitry are set at a high enough level to detect unwanted human intrusions, the vibration due to a helicopter landing may be sufficient to trigger an unwanted false alarm.

SUMMARY OF THE INVENTION

To overcome the foregoing problems, the present invention comprises signal-processing circuitry for use in an intrusion detection system that provides both flexibility and adaptability to many different intrusion detection situations, and also provides an automatic means for rejecting a multiplicity of signals that would otherwise trigger a false alarm, which are caused by a general increase in the prevailing level of noise or vibration in the vicinity of the sensor or sensors used.

Commonly, a complete intrusion detection system includes one or more sensors and one or more alarm devices or warning devices. The signal-processing circuitry to which the present invention is directed may be provided as part of a complete system including such sensor or sensors and alarm or warning devices, or may be provided separately, with the user of the system then able to select sensing devices and select alarm or warning devices suitable to the situation.

In one aspect of the invention, a number of signal processors are provided each including a bandpass filter tuned to a selected frequency range. Each filter receives the output of a least one of the sensors used for the system. The output can be received direct from the sensor or via some intervening signal processing circuitry. (It is to be understood that it is conventional in the electrical design arts to include a variety of circuit elements having discrete functions that may be desirable or even necessary to proper operation of the system, but yet which have no direct relationship to the special signal processing apparatus being described. For example, if the output signal from the filter has to travel long distance before reaching the remaining signal-processing circuitry, it may be desirable to incorporate an amplifier for the signal in the vicinity of the filter so that the strength of the amplified signal at the input of the rest of the signal-processing circuitry is adequately high. When reading this specification, the reader should understand that the electrical engineer designing the circuit may elect to provide conventional signal-modifying circuit elements, e.g. line frequency reject notch filters, preamplifiers, delay or equalizing circuits, variable gain controls, etc. as may be suitable. Accordingly, when in this description it is stated that one circuit element receives as an input the output of some other circuit element upstream, it is to be understood that there may well be intervening elements between the two specified elements which process or massage the signal in some way according to the perceived design objectives of the designer). Each such bandpass filter is accordingly responsive to sensed movement having vibration frequency components within the associated passband. These signal processors each provide an output affirmative signal if the amplitude of that constituents of the input signal within the associated frequency range exceeds a predetermined level for a predetermined time interval.

The threshold amplitude level at which an output affirmative signal is generated by the signal processor can, if desired, be varied in response to prevailing ambient noise or any other criterion selected by the circuit designer. To this end, the apparatus may include a threshold bias adjustment circuit receiving an output signal from one or more of the bandpass filters which receives the sensed signal. This threshold bias adjustment circuit raises the threshold signal above which an output affirmative signal is produced by one or more other bandpass filters in response to an increase in ambient noise.

Where the intrusive movement is expected to be reflected in typical frequency nodes, then for increased rejection of false alarms, it may be desirable to combine the various bandpass filter outputs in a logic circuit, preferably after digitizing these outputs, in order to establish whether the pattern of detected signal frequency components corresponds to patterns that are known or expected by the designer to be associated with unwanted human intrusion. To that end, several different affirmative output signals may be provided within different frequency channels; equally, one or more inhibiting output signals could be provided in response to detected frequencies within other frequency channels for the purpose of adjusting the threshold bias of the other channels or even for outright rejection of the affirmative signals that otherwise might trigger an alarm.

DETAILED DESCRIPTION

Figure 1:
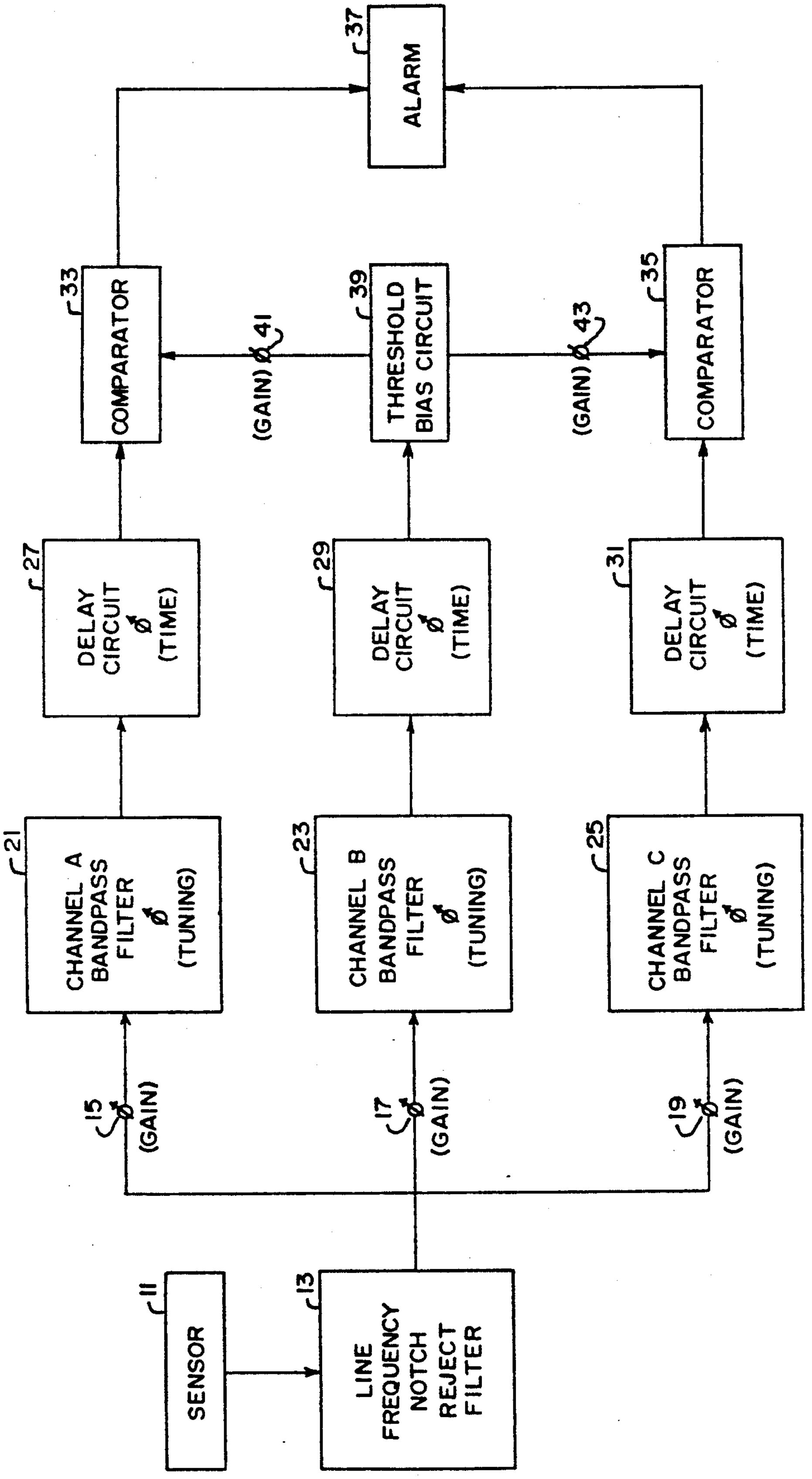
FIG. 1 is a block diagram of intrusion detection signal processing apparatus in accordance with one embodiment of the invention.

Referring to FIG. 1, a sensor 11 is placed within or near a secured space for detecting intrusive movement. The sensor 11 might be for example, a noisy coaxial cable, microphone detector, pressure-sensitive detector, or any other suitable sensing device adapted to the particular installation.

The sensor output passes through a line-frequency notch reject filter 13, so as to reject spurious signal components at the line frequency (typically 60 Hz in North America 50 Hz in Europe, for example).

The output of the notch filter 13 is applied to each of a number of bandpass filters. The number of bandpass filters to be chosen will be dependent upon the application. In FIG. 1, three bandpass filters are included for reasons of simplicity, although in many applications more bandpass filters would be expected to be included.

(Throughout this description it is understood that any conventional signal processing devices may be inserted in the circuitry where desired to massage or modulate the signal in some suitable way. Equally, in some cases electrical engineers will recognize that the sequence of various elements could be reversed. Notch filters could, for example, follow the bandpass filters. But it is easier and less expensive to have a single notch filter precede all of the bandpass filters.

Specifically, the output from the notch filter 13 is passed via adjustable gain controls (or adjustable attenuators) 15, 17, 19 to respective bandpass filters 21, 23, 25, which have been designated for convenience the channel A filter, the channel B filter, and the channel C filter respectively. Each filter 21, 23, 25 is independently tunable to a particular passband selected by the designer.

In the particular example being discussed, it is assumed that channels A and C are tuned to two separate frequency ranges in which signal components representative of unwanted human intrusion are likely to occur. Channel B by contrast is an ambient noise channel; the bandpass filter 23 is tuned to that frequency range in which ambient noise, especially occasionally occurring ambient noise of fairly strong amplitude, is expected to occur.

Although only a single sensor is shown providing a split input to each of the three bandpass filters 21, 23, 25, it is to be understood that a number of different sensors could be employed, each of which could provide an output to one or more channels. Sensors may be associated with bandpass filters on a one-to-one basis, or otherwise as the designer may choose.

The outputs of the three bandpass filters 21, 23, 25 are applied as inputs to delay circuits 27, 29, 31 respectively. Preferably these delay circuits are adjustable as to the time interval during which effective delay of the output signal of the associated bandpass filter is subjected. These delay circuits have the effect of rejecting very short, transient signals, even if they exceed a particular threshold amplitude, so that such signals, which typically are spurious signals not caused by unwanted human intrusion, may be rejected.

The outputs of delay circuits 27 and 31 from the channel A bandpass filter 21 and channel C bandpass filter 25, which are expected to reflect different types of intrusive human movement, are passed to comparator circuits 33 and 35 respectively. These comparator circuits compare the output signal received from their associated delay circuits against a threshold amplitude. If that amplitude is exceeded, then the comparator generates an alarm signal which is passed to a suitable alarm or warning device 37.

Because occasional high ambient noise levels may, unless countermeasures are taken, provoke spurious signals and therefore false alarms as a consequence of relatively high signal levels passing through the channel A and channel C bandpass filters 21, 25 respectively, the channel B ambient noise bandpass filter 23 provides its output to a threshold bias circuit 39 which in turn varies the threshold level operating in comparators 33 and 35 respectively. The variation is effected via adjustable gain controls 41, 43 respectively. As the signal passed by the channel B bandpass filter 23 increases, so does the threshold amplitude against which comparators 33 and 35 test the input signal that they receive within channels A and C respectively. So as ambient noise increases, accordingly a higher level of signal component within channels A and C is required to trigger an alarm.

To take again the helicopter example, if a helicopter is landing, it may be expected to create a general increase in signal level within all or many frequency ranges to which various bandpass filters may be tuned. Consequently, every time the helicopter landed there would be an alarm signal triggered, unless a suitable countermeasure were taken. The countermeasure taken is to increase the threshold amplitude at which the comparators 33 and 35 generate an alarm signal when the landing noise is occurring. The threshold amplitude governing comparators 33 and 35 increases in response to ambient noise, which will be received by the channel B bandpass filter 23 and passed on to the threshold bias circuit 39 so as to raise the threshold amplitudes against which comparators 33 and 35 test the output signal from the channel A and channel C bandpass filters 21, 25 respectively. Alternatively, the circuit 39 (or some substitute circuit) could simply nullify the alarm trigger signal when ambient noise level is above some specific level. (It may be tolerable to have the intrusion detection circuit rendered inoperative when the secured area is the site of activity by authorized personnel.)

To give a more specific working example, the sensor 11 might be a strain-sensitive coaxial cable mounted on a perimeter fence, say a chain-link fence. Human intrusive movement in the vicinity of the perimeter fence causing flexing or stretching of the coaxial cable, would be expected to produce characteristic nodes at relatively low frequencies (typically less than 30 Hz) and thus the coaxial cable would be expected to produce a reasonably strong output signal in relatively low frequency ranges under about 30 Hz. So if the channel A bandpass filter were a low-pass filter tuned to a frequency-range below about 30 Hz, the output from that filter could be used to generate a useful affirmative signal which, if higher than the established threshold amplitude, would trigger the alarm.

The channel C bandpass filter might be tuned for example, to the range 15 KHz to 30 KHz; it has been found that within this frequency range there are characteristic amplitude nodes reflective of the cutting of a wire. Consequently if the perimeter fence wire were being cut or even if the coaxial cable itself were being cut, a characteristic signal would be expected to occur within channel C (15 KHz to 30 KHz). This too could trigger the alarm if the amplitude of the sensed signal within this frequency range exceeds the threshold established for the comparator 35.

The channel B bandpass filter could be a very broad frequency range filter; indeed in some cases the channel B filter might encompass all useful frequencies. In other cases, it may be desired to tune the channel B filter to the most prevalent frequency ranges of ambient noise expected to occur, or to particular types of ambient noise that reflect certain types of acceptable intrusion (the helicopter landing, in the example previously used, or perhaps the opening of a gate under the protection of a guard, or something of that sort). If the ambient noise detected within channel B is sufficiently high, the threshold bias adjustment circuit 39 will raise the amplitude levels above which the output signals from channel A and channel C filters 21, 25 respectively must be in order to trigger an alarm.

The specific circuits used to implement the block diagram of FIG. 1 are entirely within the conventional choice of the designer. Bandpass filter design is a straightforward exercise; both active and passive filters are known, any suitable ones of which may be chosen for the particular type or types of installation for which the system has been designed. The delay circuits may be conventional resistance-capacitance circuits. The comparator circuits may use conventional differential amplifiers or similar analog-circuit devices. The threshold bias circuit may simply be applied as a bias to the comparator via a resistor or voltage divider. The alarm circuit may be any suitable conventional alarm or warning device.

The circuit of FIG. 1 may be entirely analog in character. However, for more complex arrangements, it is usually desirable to digitize the signals corresponding to selected frequency ranges before performing comparisons. To this end, the circuitry of FIG. 2 is suitable.

Figure 2:
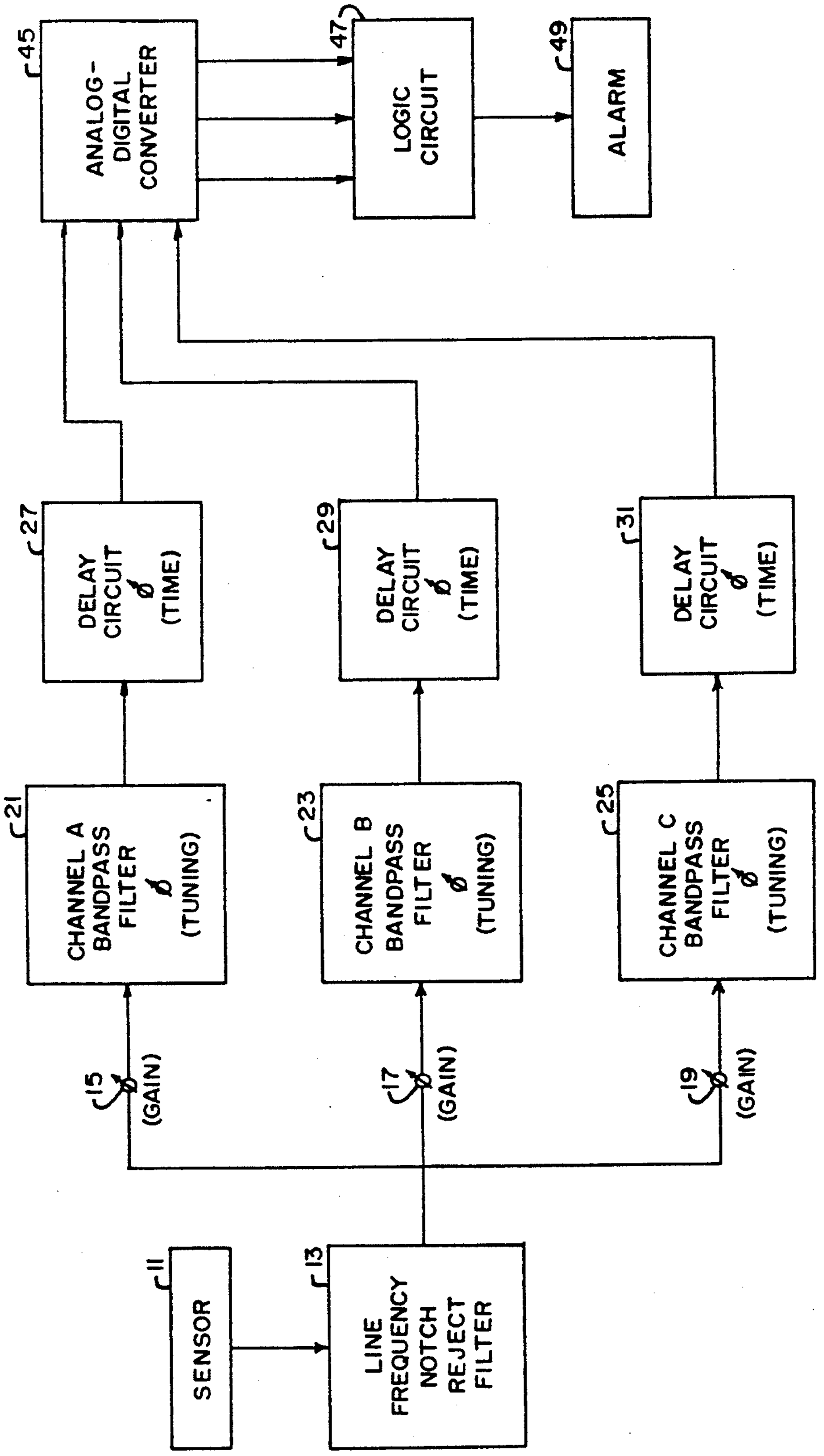
FIG. 2 is a block diagram of signal processing apparatus for use in association with an intrusion detection system in accordance with a second embodiment of the invention.

The FIG. 2 circuitry can be substantially identical to the FIG. 1 circuitry up to the point of output of the delay circuits 27, 28, 31. However, instead of having the delay circuit outputs fed to bias circuits or comparators, their outputs, preferably following full-wave rectification, are digitized by a conventional analog-digital converter 45. The analog-digital converter preserves the frequency sensitive information and provides as many digitized outputs as there are analog inputs, each digital output corresponding to a particular frequency range passed by a particular bandpass filter. These digital outputs are all provided to a logic circuit 47 which performs the required comparisons.

The comparisons required are those chosen by the designer for any particular installation. If the only comparisons chosen are the same as those described with reference to FIG. 1, then one of the digital signals corresponding to the analog signal within the frequency range passed by the channel B bandpass filter 23 will be used to raise the effective threshold at which the digitized signal corresponding to channels A and C respectively generate an output alarm signal. In more complex installations, the designer may decide that, for example, if affirmative signals are capable of being generated by, say, half a dozen bandpass filters, that it will be necessary for affirmative signals to be present in at least four of the six channels before an alarm is triggered. Equally, the amplitude level at which an alarm is triggered may be raised, depending upon whether one or more ambient noise channels are providing sufficiently strong signals. It can be seen that the complexity of the logic circuitry can quickly escalate as the number of channels being examined increases in number. The choice of the number of channels to be examined and their role with reference to the frequency ranges selected will be highly dependent upon the particular security installation for which the system is chosen and will equally be dependent upon the system designer's expectations. In appropriate cases, the circuitry could be absolutely standard with only the gain, tuning, and time adjustments being set for a particular installation and the logic circuit being governed by a particular replaceable EPROM memory chip selected for the particular type of installation in question.

The alarm device 49 can be any conventional alarm or warning device responsive to a suitable output provided by the logic circuit 47. The only difference between the alarm 37 of FIG. 1 and the alarm 49 of FIG. 2 is that the FIG. 1 alarm 37 is triggered by either of two analog signals, whereas the alarm 49 is triggered by a single output signal of the digital circuitry 47.

Further variants in the circuitry will be apparent to those skilled in the art without departing from the scope of the invention, which is as defined in the accompanying claims.

What is claimed is:

1. An improvement in intrusion detection apparatus having at least one sensor for sensing movement, each sensor producing a vibration-sensitive output signal representing such movement, the improvement comprising:

a plurality of bandpass filters each receiving at least one such vibration-sensitive output signal and passing signal components thereof within a selected discrete frequency range;

a comparator for comparing the amplitude of the signal components passed by and received from at least one of said bandpass filters against a threshold amplitude; and a threshold bias adjustment means for adjusting said threshold amplitude, said adjustment means connected to and receiving the signal components passed by at least another of said bandpass filters whose output amplitude is used by said adjustment means to adjust the threshold amplitude;

said comparator providing an affirmative output signal when the amplitude of the signal components received exceeds the threshold amplitude.

2. Apparatus as defined in claim 1, wherein the frequency range selected for at least one of the bandpass filters is below about 30 Hz, to include an expected frequency range of human intrusive movements.

3. Apparatus as defined in claim 1, wherein the frequency range selected for at least one of the bandpass filters is in the range of about 15 KHz to 30 KHz, to include an expected frequency range for wire cutting.

4. Apparatus as defined in claim 1, wherein the bandpass filter whose output is used to adjust the threshold amplitude is tuned to a frequency range corresponding to non-intrusive ambient noise.

5. Apparatus as defined n claim 1, wherein the vibration-sensitive output signal produced by each sensor is an analog signal, and additionally comprising operatively connected analog-to-digital conversion means for transforming said sensor output signal or an analog signal derived therefrom to a counterpart digital signal constituting a vibration-sensitive output digital signal representing movement sensed by the sensor.

6. Apparatus as defined in claim 1 additionally comprising for each bandpass filter an associated delay circuit that passes signals from its associated bandpass filter within the associated selected frequency range of a given amplitude, only if such signals persist for longer than a predetermined period of time.

7. Apparatus as defined in claim 1 wherein each said bandpass filter is a component of an associated signal processor circuit having an individually adjustable gain.

* * * * *